Patented July 26, 1938

2,124,611

UNITED STATES PATENT OFFICE 2,124,611

CELLULOSE DERIVATIVE COMPOSITIONS AND THE METHOD OF MAKING THE SAME

Camille Dreyfus, New York, N. Y.

No Drawing. Application August 14, 1934,
Serial No. 739,737

13 Claims. (Cl. 106—40)

This invention relates to the preparation of compositions containing derivatives of cellulose that contain compounds of weighting materials therein in a special dispersed form.

An object of my invention is to prepare compositions containing derivatives of cellulose and having dispersed therein compounds of a weighting material in such a form as to render the same capable of forming articles of enhanced properties. Other objects of my invention will appear from the following detailed description.

In forming plastic compositions containing derivatives of cellulose, it is the practice to incorporate therein filling materials, such as pigments, in order to impart desired properties such as color and such as increased weight for the purpose of lowering the cost of the material. However, the incorporation of appreciable amounts of pigment considerably reduces the strength of the product and renders it brittle. Furthermore, the presence of such pigments renders the product relatively opaque.

I have found that if compounds of weighting materials are incorporated in cellulose derivative products by treating the same with solutions of salts of weighting materials under such conditions that swelling occurs and then fixing the weighting compound therein in a suitable manner, such as by treating with solutions of soluble phosphate and/or silicates, the weighting compound is dispersed therein in such a form that molded products of unique characteristics can be produced therefrom. These compounds are present in such a form that they interfere but little with the transparency of the product, thus rendering it possible to produce cellulose derivative products that are heavily loaded, but are still transparent or at least translucent.

In accordance with my invention, I form products comprising derivatives of cellulose having compounds of weighting metals dispersed therein in a special form and subject the same to heat and pressure to impart desired shape thereto, preferably in the presence of an agent that tends to soften or swell the same.

Any suitable derivative of cellulose may be used in this invention such as cellulose nitrate or organic derivatives of cellulose such as organic esters of cellulose and cellulose ethers. Examples of organic esters of cellulose are cellulose acetate, cellulose formate, cellulose butyrate and cellulose propionate, while examples of cellulose ethers are ethyl cellulose, methyl cellulose and benzyl cellulose.

The derivative of cellulose may be loaded with the weighting compound while in any form, such as fibres or granules, but preferably in very finely divided forms such as powder, or fine artificial filaments in the form of individual filaments or in yarn or fabric.

While I prefer to employ tin, preferably in the form of stannic chloride, as the weighting salt, compounds of other weighting metals such as barium, tungsten, zinc, aluminum and lead may be employed. In carrying out the weighting process, the derivative of cellulose in suitable form is preferably treated with an aqueous solution of the weighting salt such as the acetate of lead or the chloride of the other metals mentioned under such conditions that swelling of the derivative of cellulose occurs. Sufficiently concentrated solutions of stannic chloride or zinc chloride act as swelling agents themselves, but if the solution of the weighting salt employed does not of itself act as a swelling agent, extraneous swelling agents such as acetic acid, formic acid, acetaldehyde and the like are preferably added to the solution. Alternatively, the cellulose derivative may be first swelled by treating with a swelling agent and then treated with a solution of the metal salt, which may or may not contain a swelling agent.

After treatment of the cellulose derivative product with the solution of the metal weighting salt, the same is then treated, either with or without intermediate washing, with a solution of a phosphate such as the phosphates of sodium, potassium or ammonium, or disodium phosphate. If one combined treatment with the weighting solution and with the phosphate is not sufficient to give the desired increased weight, this process may be repeated two or more times until the desired weight is imparted. Whether the material is treated with the phosphate or not, preferably the material is finally treated with the solution of sodium or potassium or other soluble silicate. Alternatively, the cellulose derivative material may be impregnated with or soaked with a solution of the metal salt, such as stannic chloride containing a swelling agent, and then while impregnated with the desired amount of the solution treated with an alkaline hydroxide or carbonate to hydrolyze the metal compound while drying, and after it is dried it may be treated with the soluble phosphate and/or silicate.

Any suitable weighting method may be employed, reference being had for instance to U. S. Patents Nos. 1,631,062, 1,731,298, 1,798,836, 1,905,453, 1,805,467, 1,805,468, 1,806,043, 1,817,741, 1,821,464 and 1,867,658 for some methods of weighting the material.

According to this invention amounts of weighting compounds equal to less than 5 to 100% or more of the weight of the cellulose derivative may be incorporated therein. These weighting compounds are present in the derivative of cellulose material in very finely divided form, the majority of the particles thereof having a diameter of less than 0.2 micron.

The weighted cellulose derivative may then be subjected to any process to cause the same to coalesce. Preferably plasticizers such as triacetin, diethyl phthalate, dimethyl phthalate, dibutyl tartrate, the phthalate of the mono methyl ether of glycol, methyl phthalyl ethyl glycolate, ethyl toluene sulfonamid, etc. are incorporated with the weighted organic derivative of cellulose. The amount of plasticizers added may be from less than 10 to 30% or more of the weight of the cellulose derivative originally employed. Fire retardants such as triphenyl phosphate, chlorinated naphthalene and the like may also be incorporated.

These plasticizers may be incorporated in any suitable manner to form an intimate and close admixture of the cellulose derivative and the plasticizer to form powders that may be readily molded under heat and pressure. Thus, the finely divided derivative of cellulose may be agitated or stirred in any suitable device such as a colloid mill or ball mill with an aqueous suspension of the plasticizer whereby the plasticizer is adsorbed by the derivative of cellulose particles. Alternatively, the derivative of cellulose particles may be sprayed or impregnated with a solution of the plasticizer in a volatile liquid, such as benzol, that is not a solvent for the derivative of cellulose, and the volatile liquid permitted to evaporate.

Cellulose acetate when weighted is in unique form, since solvents for ordinary cellulose acetate, such as acetone, do not have a true solvent action thereon. It is therefore quite surprising that this material should be capable of consolidating under the action of heat and pressure in the presence of plasticizers or swelling agents.

To aid molding or coalescence a small amount of relatively volatile substances that have a swelling action on the weighted derivative of cellulose may be added such as acetone, a mixture of acetone and ethyl alcohol or a mixture of diethylene chloride and ethyl alcohol, etc. These volatile liquids may be used alone or in conjunction with plasticizers.

To impart any desired color, dyes or lakes may be incorporated in the material, especially when translucent or transparent products are desired. If opaque products are desired, ordinary pigments of desired color may be added.

The product of this invention may be subjected to heat and pressure to cause coalescence in the desired form. Temperatures of 50 to 180° C. are suitable for this purpose. Examples of suitable pressures are from 100 to 6,000 lbs. per square inch, the higher the pressure employed the lower the temperature required.

An economical source of weighted organic derivative of cellulose material is scraps or waste of weighted cellulose acetate yarns or fabrics.

Any suitable article may be made from the composition of this invention, such as combs, mirror handles, tooth brush holders or other toilet articles; pencil or fountain pen barrels, phonograph records; telephone receivers and other electrical apparatus, as well as coated fabrics, etc.

The molding composition may be subjected to heat and pressure molds to form the desired article, or articles may be made therefrom by extrusion molding, wherein the material is softened to plastic condition by heating and is forced by pressure into closed molds of desired form. The molding composition may be also worked between heated malaxating rolls and the sheets thus formed stacked and block pressed and then subjected to the other operations common in the cellulose derivative plastic industry. In making coated fabric, a fabric of cotton or other non-thermoplastic material may have the composition comprising the weighted cellulose derivative and plasticizer applied thereto by heat and pressure, such as by means of heated calendar rolls.

In order further to illustrate my invention, but without being limited thereto the following specific examples are given.

*Example I*

1 kilogram of cellulose acetate, in the form of yarn, filaments in staple or continuous lengths, or fabrics or finely divided powder or fibre form is treated for 90 minutes in a bath consisting of 30 kilograms of an aqueous solution of stanic chloride of 32° Bé. (31% concentration) and containing 5% of formic acid, the bath being maintained at a temperature of 25° C. The cellulose acetate is removed from the bath and rinsed with cold water until neutral. It is then entered in a bath of an aqueous solution of disodium phosphate of 6.5° Bé. (10% concentration). After treatment in the phosphate bath at 50 to 60° C. for 20 minutes the cellulose acetate is removed and rinsed. It may then be given repeated treatments with the stannic chloride and the disodium phosphate baths to impart greater weighting. After rinsing, it is finally treated with an aqueous solution of sodium silicate of 1.5° Bé. 2.5% (concentration) and then washed until neutral and then dried.

The product so produced is then formed into a molding composition by intimate admixture with 200 to 1,000 grams of a suitable swelling agent, such as acetone, to form a molding composition, which is then pressed in molds of desired shape at temperatures of 60 to 100° C. and at a pressure of 3,000 to 4,000 lbs. per square inch to form articles having the desired properties above described. If desired, a plasticizer such as dimethyl phthalate may be incorporated in this molding composition.

*Example II*

4.5 kilograms of powdered cellulose acetate are stirred in 80 litres of an aqueous solution of stannic chloride of 32° Bé. (31% concentration) at 25° C. for 90 minutes. The cellulose acetate is then filtered off, washed twice with water and then stirred in 80 litres of an aqueous solution of sodium silicate of 1.5° Bé. (2.5%) at 55° C. for 30 minutes. The cellulose acetate is then filtered and washed with water until neutral and dried.

Two (2) kilograms of the weighted cellulose acetate so produced are suspended in 40 litres of water and 500 grams of a plasticizer such as triacetin or dimethyl phthalate are incorporated by agitation, such as by passing through a colloid mill. The cellulose acetate absorbs the plasticizer and is then separated from the water by filtration and is then dried. This product is molded in suitable molds to desired form by application of a pressure of 2,500 lbs. per square inch at 120° C.

It is to be understood that the foregoing detailed description is given merely by way of illustration and many variations may be made therein without departing from the spirit of my invention.

Having described my invention, what I desire to secure by Letters Patent is:

1. An article of manufacture produced by coalescence of a derivative of cellulose product having a weighting compound dispersed therein in such a form as may be produced by treating the cellulose derivative material in attenuated form with a solution of a weighting salt under such conditions that swelling of the derivative of cellulose occurs and then fixing the weighting compound in the form of an insoluble compound.

2. An article of manufacture produced by coalescence of an organic derivative of cellulose product having a weighting compound colloidally dispersed therein in such a form as may be produced by treating the organic derivative of cellulose material in attenuated form with a solution of a weighting salt under such conditions that swelling of the organic derivative of cellulose occurs and then fixing the weighting compound in the form of an insoluble compound.

3. An article of manufacture produced by coalescence of a cellulose acetate product having a weighting compound dispersed therein in such a form as may be produced by treating the cellulose acetate material in attenuated form with a solution of a weighting salt under such conditions that swelling of the cellulose acetate occurs and then fixing the weighting compound in the form of an insoluble compound.

4. An article of manufacture produced by coalesence of a cellulose nitrate product having a weighting compound dispersed therein in such a form as may be produced by treating the cellulose nitrate material in attenuated form with a solution of a weighting salt under such conditions that swelling of the cellulose nitrate occurs and then fixing the weighting compound in the form of an insoluble compound.

5. Process of producing articles comprising treating a cellulose acetate product in the form of a fine powder with a solution of stannic chloride under such conditions that swelling of the cellulose acetate occurs, fixing the tin therein in the form of a water insoluble compound and then subjecting the product to heat and pressure to coalesce the product.

6. Process of producing articles comprising treating a cellulose acetate product in the form of fine filaments with a solution of stannic chloride under such conditions that swelling of the cellulose acetate occurs, fixing the tin therein in the form of a water insoluble compound and then subjecting the product to heat and pressure to coalesce the product.

7. Process of producing articles comprising treating a cellulose acetate product in the form of a fine powder with a solution of stannic chloride under such conditions that swelling of the cellulose acetate occurs, fixing the tin therein in the form of a water insoluble compound and then subjecting the product to heat and pressure in the presence of a swelling or softening agent to coalesce the product.

8. Process of producing articles comprising treating a cellulose acetate product in the form of fine filaments with a solution of stannic chloride under such conditions that swelling of the cellulose acetate occurs, fixing the tin therein in the form of a water insoluble compound and then subjecting the product to heat and pressure in the presence of a swelling or softening agent to coalesce the product.

9. Process of producing articles comprising treating a cellulose acetate product in the form of a fine powder with a solution of stannic chloride under such conditions that swelling of the cellulose derivative occurs, fixing the tin therein in the form of a water insoluble compound and then subjecting the product to heat and pressure in the presence of a material adapted to soften the same to coalesce the product.

10. Process of producing articles comprising treating a cellulose derivative material in attenuated form with a solution of stannic chloride under such conditions that swelling of the cellulose derivative occurs, fixing the tin therein in the form of a water insoluble compound and then subjecting the product to heat and pressure to coalesce the product.

11. Process of producing articles comprising treating a cellulose derivative product in the form of a fine powder with a solution of stannic chloride under such conditions that swelling of the cellulose derivative occurs, fixing the tin therein in the form of a water insoluble compound and then subjecting the product to heat and pressure to coalesce the product.

12. Process of producing articles comprising treating a cellulose derivative product in the form of a fine powder with a solution of stannic chloride under such conditions that swelling of the cellulose derivative occurs, fixing the tin therein in the form of a water insoluble compound and then subjecting the product to heat and pressure in the presence of a swelling or softening agent to coalesce the product.

13. Process of producing articles comprising treating a cellulose derivative product in the form of fine filaments with a solution of stannic chloride under such conditions that swelling of the cellulose derivative occurs, fixing the tin therein in the form of a water insoluble compound and then subjecting the product to heat and pressure to coalesce the product.

CAMILLE DREYFUS.